US009609373B2

(12) United States Patent
Rango et al.

(10) Patent No.: US 9,609,373 B2
(45) Date of Patent: Mar. 28, 2017

(54) PRESENTATION TIMELINE SYNCHRONIZATION ACROSS AUDIO-VIDEO (AV) STREAMS

(71) Applicant: BROADCOM CORPORATION, Irvine, CA (US)

(72) Inventors: Robert Americo Rango, Newport Coast, CA (US); Walter Glenn Soto, San Clemente, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 233 days.

(21) Appl. No.: 14/148,625

(22) Filed: Jan. 6, 2014

(65) Prior Publication Data
US 2015/0121436 A1  Apr. 30, 2015

Related U.S. Application Data

(60) Provisional application No. 61/895,970, filed on Oct. 25, 2013.

(51) Int. Cl.
*H04N 7/173* (2011.01)
*H04N 21/242* (2011.01)
(Continued)

(52) U.S. Cl.
CPC .......... *H04N 21/242* (2013.01); *G11B 27/10* (2013.01); *G11B 27/34* (2013.01);
(Continued)

(58) Field of Classification Search
CPC .. H04N 21/242; H04N 21/2187; H04N 21/81; H04N 21/482; H04N 21/8126; H04N 21/231
(Continued)

(56) References Cited

U.S. PATENT DOCUMENTS 5,729,471 A * 3/1998 Jain ................ H04N 5/222
 345/419
6,144,375 A * 11/2000 Jain ................ G06F 17/30017
 345/420
(Continued)

FOREIGN PATENT DOCUMENTS

WO  WO 2013/013176  * 1/2013

OTHER PUBLICATIONS

"Livestream—Watch Thousands of Live Events & Live Stream Your Events", retrieved from <http://new.livestream.com/> on Dec. 3, 2013, 12 pages.
(Continued)

Primary Examiner — Brian T Pendleton
Assistant Examiner — Alan Luong
(74) Attorney, Agent, or Firm — McDermott Will & Emery LLP

(57) ABSTRACT

A system for presentation timeline synchronization across audio-video (AV) streams associated with a common event may include memory and a processor. The processor may be configured to receive metadata items from a user device during a live event, the metadata items corresponding to points-in-time marked by the user while being presented with an audio-video (AV) stream associated with the live event. The metadata items may include timing indicators that are indicative of the marked points-in-time relative to the start of the live event. The processor may be configured to provide to the user device with other AV streams associated with the live event that were available at one of the points-in-time marked by the user. The processor may be configured to provide the other AV streams to the user device beginning with a frame that corresponds to the one of the points-in-time marked by the user.

22 Claims, 7 Drawing Sheets

(51) Int. Cl.
| | |
|---|---|
| H04N 21/2187 | (2011.01) |
| H04N 21/8547 | (2011.01) |
| H04N 21/235 | (2011.01) |
| H04N 21/43 | (2011.01) |
| G11B 27/10 | (2006.01) |
| G11B 27/34 | (2006.01) |
| H04N 21/2365 | (2011.01) |
| H04N 21/236 | (2011.01) |
| H04N 21/44 | (2011.01) |

(52) U.S. Cl.
CPC ..... *H04N 21/2187* (2013.01); *H04N 21/2353* (2013.01); *H04N 21/2365* (2013.01); *H04N 21/23614* (2013.01); *H04N 21/4307* (2013.01); *H04N 21/44016* (2013.01); *H04N 21/8547* (2013.01)

(58) Field of Classification Search
USPC .......................................... 725/88, 109, 110
See application file for complete search history.

(56) References Cited

U.S. PATENT DOCUMENTS

| | | | | |
|---|---|---|---|---|
| 6,920,181 | B1* | 7/2005 | Porter | H04N 21/23424 375/240.28 |
| 2003/0093790 | A1* | 5/2003 | Logan | G06F 17/30265 725/38 |
| 2005/0005308 | A1* | 1/2005 | Logan | G06Q 30/06 725/135 |
| 2008/0216141 | A1* | 9/2008 | Long | A63B 71/0605 725/114 |
| 2008/0320545 | A1* | 12/2008 | Schwartz | H04N 7/17318 725/135 |
| 2009/0164904 | A1* | 6/2009 | Horowitz | G06F 17/30817 715/723 |
| 2010/0251295 | A1* | 9/2010 | Amento | G11B 27/034 725/38 |
| 2011/0075990 | A1* | 3/2011 | Eyer | H04N 5/76 386/241 |
| 2011/0126252 | A1* | 5/2011 | Roberts | H04N 7/17318 725/114 |
| 2013/0279740 | A1* | 10/2013 | Bauer et al. | 382/100 |
| 2014/0157307 | A1* | 6/2014 | Cox | H04N 21/4331 725/34 |

OTHER PUBLICATIONS

"Livestream—Live Video Tools, Everything you need to live stream video", retrieved from <http://new.livestream.com//live-video-tools> on Dec. 3, 2013, 10 pages.

"Livestream—Live Blogging Tools, Tell the story of your event", retrieved from <http://new.livestream.com/live-blogging-tools> on Dec. 3, 2013, 11 pages.

"Livestream Store—Livestream Studio—Live Production Switchers", retrieved from <http://store.livestream.com/pages/livestream-studio> on Dec. 3, 2013, 8 pages.

"NeuLion—Internet Television Technology Innovators (IPTV)—What We Do", retrieved from <http://www.neulion.com/> on Dec. 3, 2013, 2 pages.

"What We Do—NeuLion Sports—NeuLion—Internet Television Technology Innovators (IPTV)—Features", retrieved from <http://www.neulion.com/SportSelect.dbml?DB_OEM_ID=30000&SPID=122708&SPSID=731710> on Dec. 3, 2013, 2 pages.

"What We Do—NeuLion Sports—NeuLion—Internet Television Technology Innovators (IPTV)—Interaction", retrieved from <http://www.neulion.com/Links.dbml?DB_OEM_ID=30000&SPID=122708&SPSID=725510&CONTENT_MODULE_CONTENT_ID=420912&content_link_name=Interaction> on Dec. 3, 2013, 2 pages.

"Live Streaming | Streaming Tank | Live Video Streaming", retrieved from <http://www.streamingtank.com/services/live-streaming/> on Dec. 3, 2013, 2 pages.

"Rihanna Live Concert Streaming Tank | Live Video Streaming", retrieved from <http://www.streamingtank.com/client/case-studies/rihanna-live-concert/> on Dec. 3, 2013, 2 pages.

"B@TV—Multiple Camera Event Streaming - Paperheads", retrieved from <http://www.paperheads.co.uk/projects/b-tv-multiple-camera-event-streaming.go> on Dec. 3, 2013, 2 pages.

\* cited by examiner

PRESENTATION TIMELINE SYNCHRONIZATION ACROSS AUDIO-VIDEO (AV) STREAMS

CROSS-REFERENCE TO RELATED APPLICATIONS

The present application claims the benefit of U.S. Provisional Patent Application Ser. No. 61/895,970, entitled "Presentation Timeline Synchronization Across Audio-Video (AV) Streams," filed on Oct. 25, 2013, which is hereby incorporated by reference in its entirety for all purposes.

TECHNICAL FIELD

The present description relates generally to audio video (AV) streams associated with a common event, and more particularly, but not exclusively, to presentation timeline synchronization across audio-video (AV) streams associated with a common event.

BACKGROUND

In traditional broadcasting systems, live events, such as live sporting events, are generally captured using numerous cameras. The owner/provider of the live event, or a production entity associated therewith, selects which camera feed is presented to viewers at any given time. The owner/provider may also determine an audio feed to provide with the camera feed, e.g. in the form of audio commentary from announcers selected by the owner/provider. In addition, the owner/provider may determine whether the camera feed should be augmented with any additional information, such as graphical overlays. Thus, in traditional broadcasting systems, viewers of a live event may only have the option of viewing/hearing an audio-video (AV) stream that is produced by the owner/provider of the live event.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
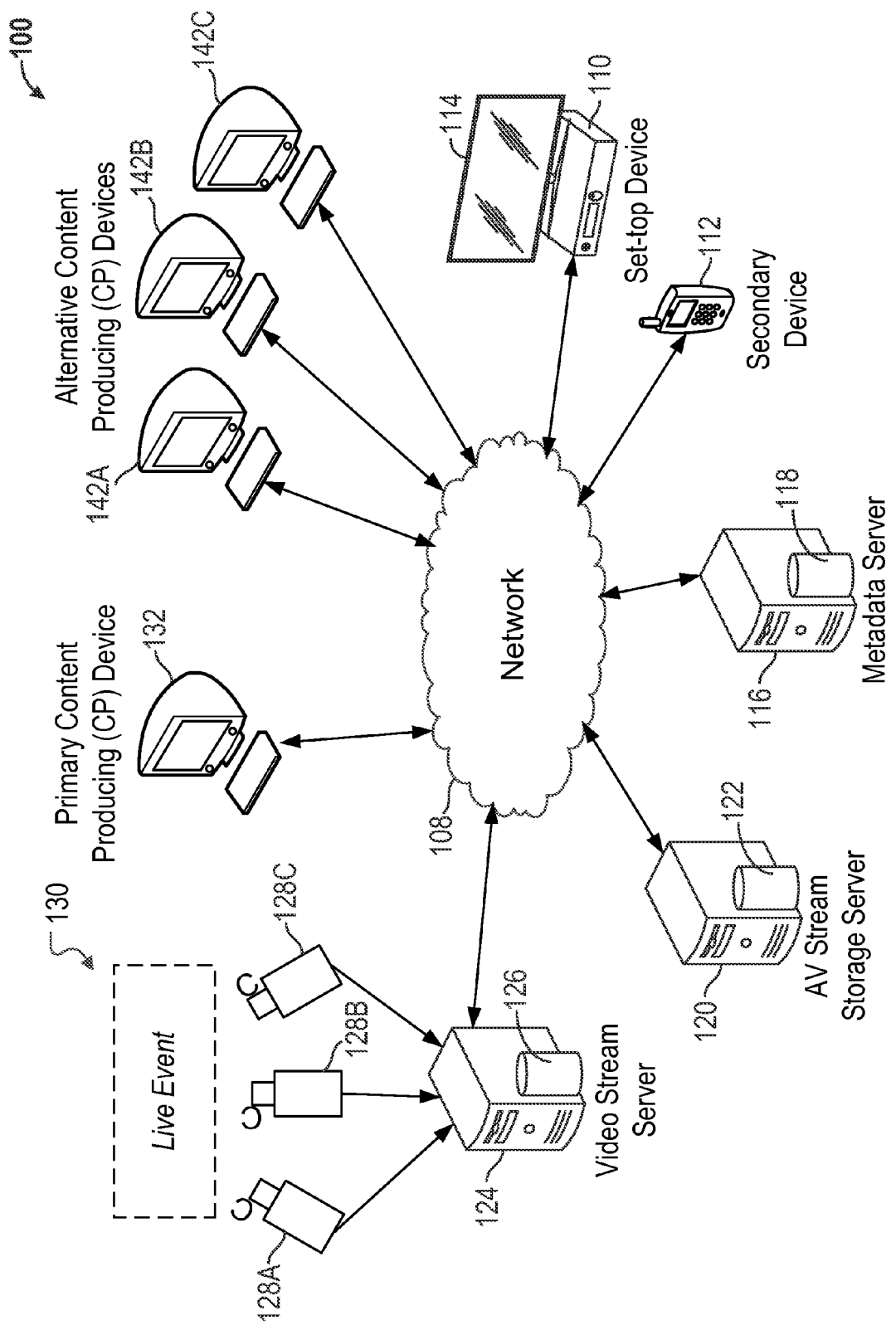
FIG. 1 illustrates an example network environment in which a system for presentation timeline synchronization across AV streams may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Live streaming technologies may allow an owner/provider of a live event to provide multiple different AV streams to viewers of a live event. For example, the owner/provider of a live event may authorize multiple individual content producers to generate AV streams for the live event. The content producers may be allowed to select from any of the available camera feeds (not just the camera feed selected by the owner/provider of the live event), and the content producers may provide their own audio feed, e.g. commentary, that supplements, or replaces, the audio feed provided by the owner/provider of the live event. The content producers may further supplement the video stream provided by a selected camera feed with supplemental video content, such as an overlay and/or a supplemental video stream. The viewers of the live event may be able to switch, at any given time, between viewing the AV stream generated by the owner/provider of the live event and viewing one of the AV streams generated by the individual content producers for the live event. However, since the AV streams may include different video streams and/or may be associated with different transmission/generation latencies, timing parameters, e.g. presentation timestamps, associated with the AV streams may not be synchronized across the AV streams.

In the subject system for presentation timeline synchronization across audio-video (AV) streams associated with a common event, a viewer of an AV stream generated for a live event (e.g. an AV stream generated by the owner/provider of the live event or an AV stream generated by one of the individual content producers), may mark one or more points in time while viewing the AV stream for the live event. The viewer may subsequently return to a marked point in time and may view any other AV streams that were generated for the live event starting at the marked point in time. Thus, the subject system provides a mechanism for correlating a marked point in time during the presentation of one AV stream generated for a live event with the same point in time (relative to the live event) during the presentation of another AV stream generated for the live event, even when timing parameters, e.g. presentation timestamps, associated with the AV streams are not correlatable and/or are not synchronized.

FIG. 1 illustrates an example network environment 100 in which a system for presentation timeline synchronization across AV streams may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a network 108, a metadata server 116 and an associated data store 118, an audio video (AV) stream storage server 120 and an associated data store 122, a video stream server 124 and an associated data store 126, video cameras 128A-C that may record a live event 130, a primary content producing (CP) device 132, alternative content producing (CP) devices 142A-C, a set-top device 110, an output device 114, and a secondary device 112.

The network 108 may be, and/or may include, a public communication network (such as the Internet, cellular data network, dialup modems over a telephone network) and/or a private communications network (such as private local area network ("LAN"), leased lines). For example, the network 108 may include a private LAN that couples the primary CP device 132 to the video stream server 124 and a public communication network that couples the alternative CP devices 142A-C to the video stream server 124. The network 108 may include one or more content distribution networks and/or content distribution channels, e.g. for distributing AV streams produced by the primary CP device 132 and/or the alternative content producers 142A-C to the set-top device 110 and/or the secondary device 112. The network 108 may include wired transmission networks, e.g. fiber-optic transmission networks, coaxial transmission networks, etc. and/or wireless transmission networks, e.g. satellite transmission networks, over-the-air antenna transmission networks, etc.

The set-top device 110 may be referred to as a set-top box and may be a device that is coupled to, and is capable of presenting AV streams to a user on, an output device 114, such as a television, a monitor, speakers, or any device capable of presenting AV streams to a user. In one or more implementations, the set-top device 110 may be integrated into the output device 114. The secondary device 112 may be a device associated with a user viewing AV streams presented by the set-top device 110 on the output device 114. In one or more implementations, the secondary device 112 may be referred to as a second-screen device and may generally be located proximal to the set-top device 110 and/or the output device 114. The secondary device 112 can be one or more computing devices, such as laptop or desktop computers, smartphones, tablet devices, or other displays with one or more processors coupled thereto and/or embedded therein. In the example of FIG. 1, the secondary device 112 is depicted as a smart phone. In one or more implementations, the set-top device 110 and/or the secondary device 112 may be referred to as a user device or a client device.

The servers 116, 120, 124, may each be individual computing devices such as computer servers, and/or may all be a single computing device. In one or more implementations, the servers 116, 120, 124 may represent one or more computing devices (such as a cloud of computers and/or a distributed system) that are communicatively coupled, such as communicatively coupled over the network 108, that collectively, or individually, perform one or more functions that can be performed server-side. The servers 116, 120, 124 may each be coupled with various databases, storage services, or other computing devices, such as the data stores 118, 122, 126, respectively. The data stores 118, 122, 126 may each include one or more storage devices, such as hard drives.

The primary CP device 132 and the alternative CP devices 142A-C may each be, or may each include, one more computing devices that are configured to produce an AV stream from a video stream, such as a video stream generated by one of the video cameras 128A-C, one or more audio streams, such audio streams that include audio commentary, and/or additional content, such as overlays, additional video content, etc. The video cameras 128A-C may be any recording device that can generate video streams, such as such as native moving picture experts group (MPEG) transport streams. The set-top device 110, output device 114, secondary device 112, servers 116, 120, 124, cameras 128A-C, primary CP device 132, and/or alternative CP devices 142A-C may be, or may include, one or more components of the electronic system discussed below with respect to FIG. 7.

When a live event 130 is occurring, the video cameras 128A-C may generate different video streams from the live event 130. For example, the video cameras 128A-C may be positioned at different angles relative to the live event 130 and/or may be located at different locations relative to the live event 130. The live event 130 may be any live event, such as a sporting event, a music event, a television show recorded live, such as a game show, etc. The live event 130 may occur at a geographic location, and the video cameras 128A-C may be located at, or proximal to, the geographic location. The video cameras 128A-C may be communicably coupled to the video stream server 124. The video stream server 124 may receive the video streams from the video cameras 128A-C, may store the video streams, e.g. in the data store 126 and/or may provide the video streams, e.g. to the primary CP device 132 and/or the alternative CP devices 142A-C.

In one or more implementations, the video cameras 128A-C may be synchronized, such as by the video stream server 124, such that the video cameras 128A-C may insert common reference clock timestamps into the video streams that are correlated to a common time base, such as a starting time of the live event 130. In one or more implementations, the common reference clock timestamps may be inserted as fields in transport stream packet headers of the video streams and/or as time marker packets that are inserted into the video streams. For example, the video stream server 124 may synchronize the video cameras 128A-C based on a common reference clock maintained by the video stream server 124 that has a time base corresponding to the start of the live event 130. In one or more implementations, the video cameras 128A-C may also insert video camera identifiers into the generated video streams, e.g. as a field inserted into transport stream packet headers and/or as inserted video camera identifier packets.

In one or more implementations, the video stream server 124 may maintain a common reference clock having a time base corresponding to the start of the live event 130. The video stream server 124 may receive the video streams from the video cameras 128A-C and may insert common reference clock timestamps based on the common reference clock into the video streams, e.g. as fields inserted into transport stream packet headers and/or by inserting common timestamp packets into the video streams. Since the transmission latency between the video cameras 128A-C and the video stream server 124 may be minimal and/or generally equivalent across the video cameras 128A-C, the video stream server 124 may be able to uniformly insert common reference clock timestamps into the video streams. In one or more implementations, the video stream server 124 may insert video camera identifiers into the video streams generated by the video cameras 128A-C, e.g. as a field inserted into transport stream packet headers and/or as inserted video camera identifier packets.

In one or more implementations, the video streams that are generated by the video cameras 128A-C, and that include inserted timestamps and/or identifiers, may be stored by the video stream server 124, such as in the data store 126. In one or more implementations, the video streams generated by the video cameras 128A-C may be transmitted to the AV stream storage server 120 and the video streams may be stored, including any inserted timestamps and/or identifiers, by the AV stream storage server 120, e.g. in the data store 122. In one or more implementations, the video streams may be stored with an identifier of the live event and an identifier of one of the video cameras 128A-C, such as the video camera 128A that generated the video stream.

The primary CP device 132 may be associated with an owner/provider of the live event, such as a football league for a football game, and/or a production entity associated therewith. When a live event 130 is occurring, the primary CP device 132 may select one or more of the video streams from the video stream server 124 and may produce an AV stream that includes the selected video stream, an audio stream, such as audio commentary by one or more announcers selected by the owner/provider of the live event 130, and/or additional content, such as an overlay. The AV stream generated by the primary CP device 132 for a live event 130 may be referred to as a primary AV stream for the live event 130.

The primary CP device 132 may select the video stream that the owner/provider of the live event 130 believes will be of most interest to viewers, such as the video stream generated by the video camera 128A with a particular angle for viewing an action event of the live event, such as a play of a football game. The primary CP device 132 may change video streams as frequently, or as often, as is desirable to the owner/entity of the live event 130. Thus, the video stream of the AV stream generated by the primary CP device 132 may include concatenated video streams generated by multiple different video cameras 128A-C. However, the video stream of the AV stream generated by the primary CP device 132 may still include the common reference clock timestamps and/or video camera identifiers previously inserted into the individual source video streams, e.g. by the video cameras 128A-C and/or the video stream server 124. In one or more implementations, the primary CP device 132 may insert video camera identifiers associated with the video stream selected by the primary CP device 132 into the generated AV stream, e.g. as fields inserted into the transport stream packet headers.

The AV stream generated by the primary CP device 132 may be provided for transmission to the set-top device 110 and/or the secondary device 112, via one or more content distribution channels of the network 108. For example, the AV stream generated by the primary CP device 132 may be provided to the set-top device 110 via a television channel of a television network. The AV stream generated by the primary CP device 132 may also be transmitted to the AV stream storage server 120, and the AV stream may be stored, including any inserted timestamps and/or identifiers, by the AV stream storage server 120, such as in the data store 122. In one or more implementations the AV stream may be stored with an AV stream identifier, an event identifier, an identifier of the primary CP device 132, and/or an identifier of an entity associated therewith, such as the owner/provider of the live event 130.

The alternative CP devices 142A-C may be associated with one or more individuals authorized by the owner/entity of the live event 130 to generate, or produce, an AV stream for the live event 130. The individuals may be, for example, former or current players of a sport corresponding to the live event 130, former or current officials or referees for a sport corresponding to the live event 130, persons of pop culture significance, political figures, or generally any individuals who may generally offer a different perspective of the live event 130 than the perspective conveyed by the AV stream generated by the primary CP device 132.

When a live event 130 is occurring, the alternative CP devices 142A-C may each select one or more of the video streams from the video stream server 124 and may each produce an AV stream that includes the selected video stream and an audio stream, such as audio commentary by the authorized individuals, and/or additional content, such as an overlay, additional video content, etc. The alternative CP devices 142A-C may select one of the video streams generated by the cameras 128A-C, e.g. a video stream corresponding to an angle or position of one of the cameras 128A-C that is most interesting to the authorized individuals. In one or more implementations, at any given time the video stream selected by one or more of the alternative CP devices 142A-C may not coincide with the video stream selected by the primary CP device 132, and/or may not coincide with the other alternative CP devices 142A-C. Thus, at any given time the source video stream included in the AV stream generated by the primary CP device 132 may be different than the source video stream included in the AV stream generated by one or more of the alternative CP devices 142A-C. Example primary AV and alternative AV streams that include different source video streams at different points-in-time are discussed further below with respect to FIG. 2.

The alternative CP devices 142A-C may change video streams as frequently, or as often, as is desirable to the authorized individuals. Thus, the video streams of the AV streams generated by the alternative CP devices 142A-C may include concatenated video streams generated by multiple different video cameras 128A-C. However, the video streams of the AV streams generated by the alternative CP devices 142A-C may include any common reference clock timestamps and/or video camera identifiers previously inserted into the individual source video streams, e.g. by the video cameras 128A-C and/or the video stream server 124. In one or more implementations, the alternative CP devices 142A-C may insert video camera identifiers associated with the video stream selected by the alternative CP devices 142A-C into the generated AV streams, e.g. as fields inserted into the transport stream packet headers. The AV streams generated by the alternative CP devices 142A-C for a live event 130 may be referred to as alternative AV streams for the live event 130.

The alternative AV streams generated by the alternative CP devices 142A-C may be provided for transmission to the set-top device 110 and/or the secondary device 112 via one or more content distribution channels of the network 108, e.g. when requested by the set-top device 110 and/or the secondary device 112. In one or more implementations, when the primary AV stream generated by the primary CP device 132 for a live event 130 is being presented to a user via the set-top device 110, the set-top device 110 and/or the secondary device 112 may provide the user with an option to view one or more of the AV streams generated by the alternative CP devices 142A-C for the live event 130. For example, an application executing on the set-top device 110 and/or the secondary device 112 may search one of the data stores 118, 122, 126, such as the data store 122, to identify alternative AV streams available for the live event 130. The user may interact with the set-top device 110 and/or the secondary device 112 to select one of the alternative AV streams. The alternative AV stream may then be provided to the set-top device 110 and/or the secondary device 112, e.g. in place of and/or in combination with, the primary AV stream for the live event 130.

The AV streams generated by the alternative CP devices 142A-C may also be transmitted to the AV stream storage server 120, and may be stored, including any inserted timestamps and/or identifiers, by the AV stream storage server 120, such as in the data store 122. In one or more implementations the AV streams may be stored with an AV stream identifier, e.g. a unique identifier generated for each AV stream, an event identifier of the live event 130, an identifier of the corresponding alternative CP device 142A, and/or an identifier of the authorized individual associated therewith.

The metadata server 116 may store, e.g. in the data store 118, metadata items that include information corresponding to, e.g., the live event 130, the AV stream generated by the primary CP device 132 and/or the entity associated therewith, the AV streams generated by the alternative CP devices 142A-C and/or the authorized individuals associated therewith, the set-top device 110, the secondary device 112, and/or the user associated therewith. For example, a metadata item may include an event identifier of a live event 130 and a timing indicator that is indicative of a point-in-time during the live event 130, e.g. relative to the common reference clock. As is discussed further below, the timing indicator may be, or may include, a common reference clock timestamp, one or more frames of a video stream associated with the point-in-time, and/or statistical information, e.g. fingerprint information, corresponding to one or more frames associated with the point-in-time.

The metadata item may further include one or more fields that may be indicative of an action that occurred at the point-in-time indicated by the metadata item. For example, a user associated with the set-top device 110 and/or the secondary device 112 may mark a point-in-time while viewing the live event 130. Thus, the generated metadata item may include an identifier of the user, and/or an identifier of the AV stream being viewed by the user at the marked point-in-time. The owner/provider of the live event, or an entity associated therewith, may also generate metadata items that relate to action events occurring during the live event 130, such as plays of a football game. Thus, a metadata item may further include a description of an action event, e.g. a play, that occurred at the point-in-time indicated by the metadata item.

In the subject system, a user viewing one of the AV streams associated with a live event 130 via the set-top device 110 may mark a point-in-time while viewing the AV stream, e.g. during or after the live event 130, via the set-top device 110 and/or the secondary device 112. The set-top device 110 and/or the secondary device 112 may generate a metadata item corresponding to the marked point-in-time. The metadata item may include an identifier of the live event 130, an identifier of the user, a timing indicator, such as a common reference timestamp retrieved from a transport stream packet corresponding to the marked point-in-time, one or more frames of the AV stream being viewed by the user, and/or statistical information describing the same, and/or an identifier of the video camera that generated the source video stream included in the AV stream at the marked point-in-time.

The metadata item may be transmitted to the metadata server 116. If the metadata item does not include a common reference clock timestamp, the metadata server 116 may correlate the timing indicator (e.g. the one or more frames and/or statistical information describing the same) with one or more frames of a video stream of one of the AV streams stored by the AV stream storage server 120 and/or one or more frames of a video stream stored by the video stream server 124. In one or more implementations, if the metadata item includes the event identifier and a video camera identifier, the metadata server 116 may search for the one or more frames in the video stream corresponding to the video camera identifier, e.g. as stored in the data store 126. In one or more implementations, if the metadata item includes an AV stream identifier, the metadata server 116 may search for the one or more frames in the AV stream corresponding to the AV stream identifier, e.g. as stored in the data store 122. In one or more implementations, if the metadata item does not include an AV stream identifier or a video camera identifier, the metadata server 116 may search for the one or more frames in the AV streams associated with the live event 130 and/or the video streams associated with the live event 130, e.g. one-by-one. In one or more implementations, the metadata server 116 may provide the one or more frames, and/or statistical information describing the same, to the video stream server 124, the AV stream storage server 120, and/or another server, to perform the search.

Once the metadata server 116 identifies one or more frames of a video stream associated with the live event 130 that match the one or more frames, and/or statistical information describing the same, included in the metadata item, the metadata server 116 may determine a common reference clock timestamp for the marked point-in-time, e.g. based at least on the common reference timestamp associated with the matched one or more frames. Since the video streams may be stored by the video stream server 124 and/or the AV streams may be stored by the AV stream storage server 120 with the inserted common reference clock timestamps, the metadata server 116 may be able to retrieve the common reference clock timestamp associated with the matching one or more frames. In one or implementations, if the matching one or more frames do not have an associated common reference clock timestamp, the metadata server 116 may retrieve other timing information associated with the one or more frames, such as a presentation time stamp (PTS), a program clock reference (PCR), etc. The metadata server 116 may insert the common reference clock timestamp (or other timing information) into the metadata item and may store the metadata item, e.g. in the data store 118.

In one or more implementations, if the metadata item includes a common reference clock timestamp but does not include the corresponding one or more frames, the metadata server 116 may retrieve the corresponding one or more frames, and may insert the corresponding one or more frames into the metadata item. In one or more implementations, the metadata server 116 may search other metadata items associated with the marked point-in-time, and/or associated with a time within a temporal threshold of the marked point-in-time, to identify additional information regarding the marked point-in-time. For example, if the owner/provider of the live event 130 generates metadata items that describe action events within the live event, such as plays within a football game, the metadata server 116 may identify a metadata item corresponding to an action event that occurred at the marked point-in-time, and/or temporally proximal to the marked point-in-time. The metadata server 116 may insert information describing the action event into the metadata item for the marked point-in-time, such as a description of a play that occurred at the marked point-in-time. An example process for generating a metadata item for a marked point-in-time is discussed further below with respect to FIG. 4.

In one or more implementations, the metadata server 116 may interface with, e.g. monitor, one or more applications running on the secondary device 112 of the user, such as social networking applications, messaging applications, etc., to allow the user to mark a point in time via these applications. For example, the user may generate a message on a social network application that includes an identifier from which the live event 130 can be determined, e.g. a hash tag corresponding to the live event 130. Thus, the subject system may monitor the social networking application on the secondary device 112 of the user and/or a publicly available social networking feed associated with the viewer (e.g. without accessing the social networking application on the secondary device 112) to determine when such a message has been generated by the user. The metadata server 116 may then generate a metadata item that includes an identifier of the live event 130, an identifier of the user, and/or a timing indicator from which the marked point-in-time can be determined, such as a common reference clock timestamp of an AV stream (or one or more frames thereof) that is being presented to the user, e.g. via the set-top device 110. Thus, the metadata server 116 may request the common reference clock timestamp from the set-top device 110 when the metadata server 116 determines that the user marked a point-in-time via the secondary device 112.

After a user has marked a point-in-time for a live event 130, the user may retrieve the marked point-in-time and may view any of the AV streams that were generated for the live event 130 at the marked point-in-time. Since the source video streams included in the AV streams are synchronized with a common reference clock, the marked point-in-time may be correlatable to any of the AV streams generated for the live event 130. An example user interface for retrieving a marked point-in-time during a live event 130, and for retrieving the available AV streams corresponding thereto, is discussed further below with respect to FIG. 3. An example process of the metadata server 116 for retrieving AV streams available at a marked point-in-time is discussed further below with respect to FIG. 5. An example process of a device associated with the user, such as the set-top device 110 and/or the secondary device 112, for marking points-in-time and subsequently retrieving AV streams available at a marked point-in-time is discussed further below with respect to FIG. 6.

Figure 2:
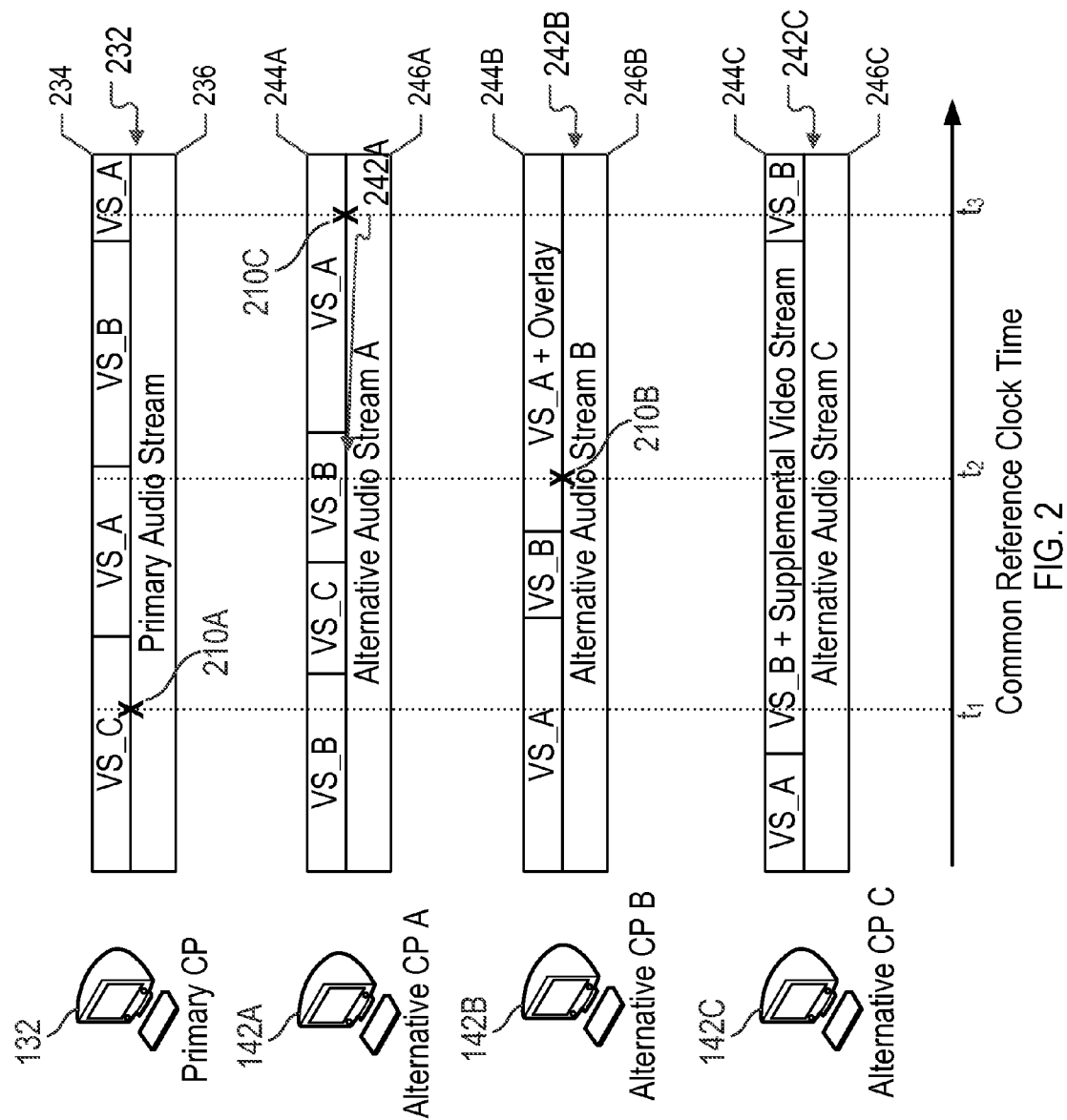
FIG. 2 illustrates an example timing diagram of a system for presentation timeline synchronization across AV streams in accordance with one or more implementations.

FIG. 2 illustrates an example timing diagram of a system for presentation timeline synchronization across AV streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The timing diagram includes a primary AV stream 232 generated by a primary CP device 132, alternative AV streams 242A-C generated by alternative CP devices 142A-B, and marked points-in-time 210A-C. The primary AV stream 232 includes a video stream 234 and an audio stream 236. The alternative AV streams 242A-C include video streams 244A-C and audio streams 246A-C. The marked points-in-time may have been marked by a user interacting with the set-top device 110 and/or the secondary device 112, e.g. while viewing one of the AV streams 232, 242A-C. The video streams 234, 244A-C may be a concatenation of source video streams generated by the video cameras 128A-C. For example "VS_A" may refer to a source video stream A that was generated by the video camera 128A, "VS_B" may refer to a source video stream B that was generated by the video camera 128B, and "VS_C" may refer to a source video stream C that was generated by the video camera 128C. Furthermore, the video streams 234, 244A-C of the AV streams 232, 242A-C may further include overlays, such as graphical overlays, e.g. as shown in the video stream 244B of the alternative AV stream 242B, and/or additional content, such as supplemental video streams, e.g. as shown in the video stream 244C of the alternative AV stream 242C.

As shown in FIG. 2, the user may have marked the marked point-in-time 210A while viewing the primary AV stream 232 which, at the marked point-in-time 210A, included the source video stream C generated by the video camera 128C, as did the alternative AV stream 242C. However, at the marked point-in-time 210A, the alternative AV stream 242A included the source video stream B generated by the video camera 128B, and the alternative AV stream 242B included the source video stream A generated by the video camera 128A. Thus, in order to correlate the marked point-in-time 210A with the alternative AV streams 242A-B, the marked point-in-time 210A may be associated with a common reference clock timestamp corresponding to the common reference time $t_1$, e.g. via metadata generated for the marked point-in-time 210A. Similarly, the marked point-in-time 210B may be associated with a common reference clock timestamp corresponding to the common reference time $t_2$, and the marked point-in-time 210C may be associated with a common reference clock timestamp corresponding to the common reference time $t_3$.

In one or more implementations, the common reference clock timestamp may be retrieved by the set-top device 110 from the primary AV stream 232 being presented to the user. In one or more implementations, the set-top device 110 may transmit one or more frames of the primary AV stream 232 that were presented at the marked point-in-time 210A to the metadata server 116, e.g. as a timing indicator of a metadata item generated for the marked point-in-time 210A. The metadata server 116 may match the one or more frames to the primary AV stream 232, e.g. as stored by the AV stream storage server 120, or to the source video stream C generated by the video camera 128C, e.g. as stored by the video stream server 124, to identify the common reference clock timestamp corresponding to the marked point-in-time.

Figure 3:
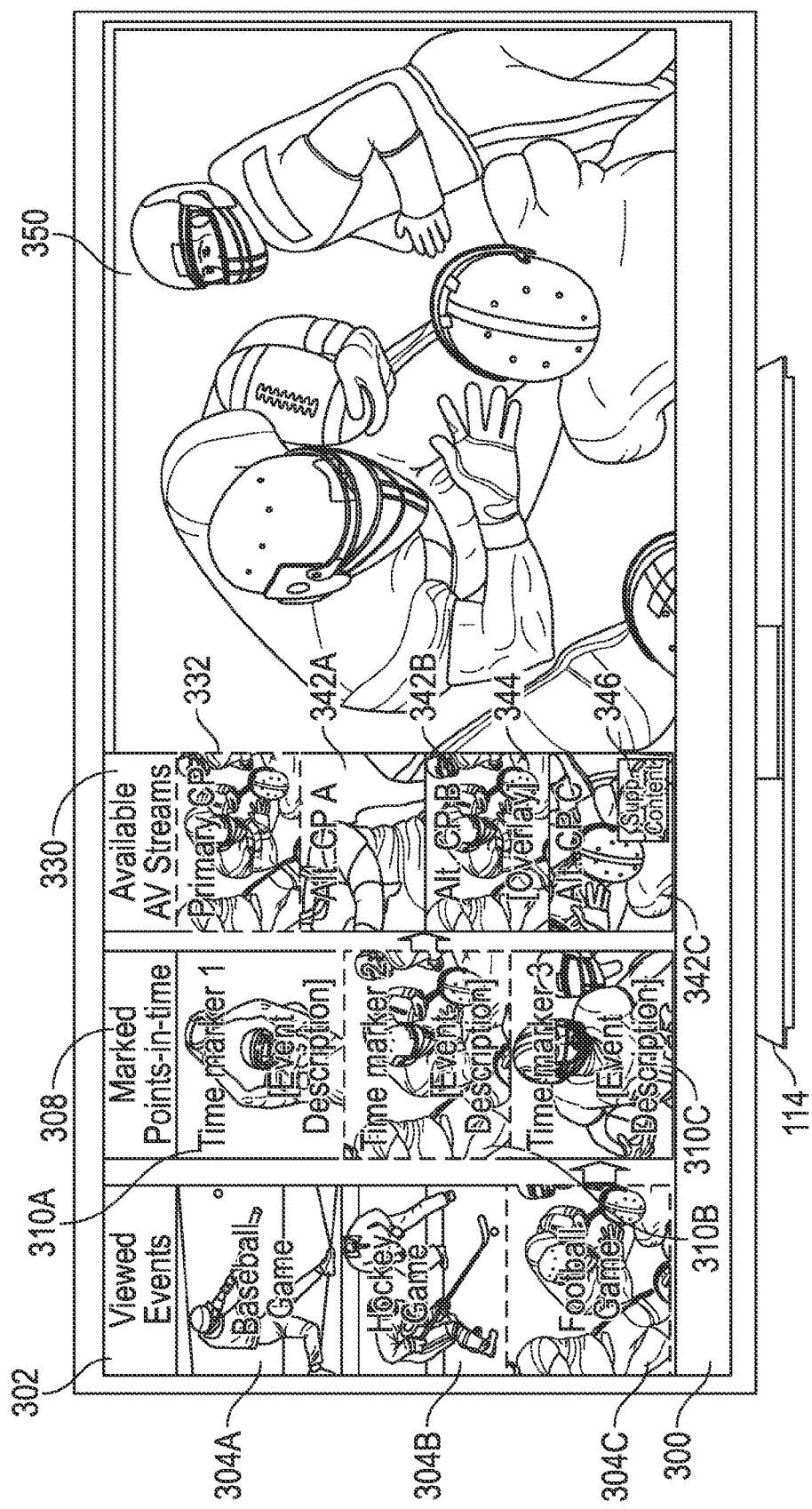
FIG. 3 illustrates an example user interface of a system for presentation timeline synchronization across AV streams in accordance with one or more implementations.

FIG. 3 illustrates an example user interface 300 of a system for presentation timeline synchronization across AV streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example user interface 300 may include a viewed events menu 302, a marked points-in-time menu 308, an available AV streams menu 330 and a main display area 350. In one or more implementations, the example user interface 300 may be presented on the output device 114, e.g. by the set-top device 110, on the secondary device 112, or generally on any device. The viewed events menu 302 may include representations 304A-C of events, the marked points-in-time menu 308 may include representations 310A-C of marked points-in-time 210A-C, and the available AV streams menu 330 may include representations 332, 342A-C of available AV streams 232, 242A-C. The events menu 302 may appear in response to a request therefor, e.g. by a user, and the menus 308, 330 may successively appear as selections are made on the menus 302, 308, respectively. In one or more implementations, the main display area 350 may be reduced in size to accommodate display of the menus 302, 308, 330, or the main display area 350 may extend behind the menus 302, 308, 330.

The events menu 302 may present representations 304A-C of events that were previously viewed by the user. The representations 304A-C may include one or more frames of the previously viewed events that may be presented to the user, e.g. the representations 304A-C may display single still frames, or a video stream that includes multiple frames. In one or more implementations, the user may log in, via the set-top device 110, to a system hosted by, e.g., the metadata server 116, to access events previously viewed on any device associated with the user, such as the set-top device 110 and/or the secondary device 112. Thus, the set-top device 110 may transmit an identifier of the user to the metadata server 116 and the metadata server 116 may retrieve and transmit the representations 304A-C to the set-top device 110. In one or more implementations, the set-top device 110 may store the events previously viewed via the set-top device 110.

The user may select one of the representations 304A-C of the viewed events menu 302, such as the representation 304C in FIG. 3. In response to the user selection, the set-top device 110 may retrieve metadata items corresponding to marked points-in-time 210A-C during the selected event and may display representations 310A-C of the marked points-in-time 210A-C via the marked points-in-time menu 308. For example, the set-top device 110 may transmit an identifier of the selected event, and the user identifier, to the metadata server 116 and the metadata server 116 may retrieve, and transmit to the set-top device 110, any metadata items corresponding to points-in-time 210A-C marked by the user during the selected event. The metadata items may include one or more frames corresponding to the marked points-in-time 210A-C. Thus, the representations 310A-C of the marked points-in-time 210A-C may display still frames or video streams corresponding to the AV streams that were presented to the user at the marked points-in-time 210A-C. If the metadata items include descriptions of action events that occurred at the marked points-in-time, the representations 310A-C may include at least a portion of the descriptions, or the descriptions may be displayed when the representations 310A-C are highlighted or otherwise selected by the user.

The user may select one of the representations 310A-C of the marked points-in-time 210A-C, such as the representation 310B in FIG. 3. In response to the user selection, the set-top device 110 may retrieve representations 332, 342A-C of AV streams 232, 242A-C that were available at the selected marked point-in-time 210B. For example, the set-top device 110 may transmit a metadata item corresponding to the selected marked point-in-time 210B, an identifier of the selected marked point-in-time 210B, and/or a common reference clock timestamp corresponding to the selected marked point-in-time 210B, to the metadata server 116 and the metadata server 116 may retrieve, and transmit to the set-top device 110, representations 332, 342A-C of the AV streams 232, 242A-C that were available at the marked point-in-time 210B. The representations 332, 342A-C may include one or more frames of the AV streams 232, 242A-C corresponding to the selected marked point-in-time 210B. Thus, the representations 332, 342A-C of the AV streams 232, 242A-C may display still frames or video streams corresponding to the marked point-in-time 210B. As shown in FIG. 3, the representation 342B of the alternative AV stream 242B includes an overlay 344 and the representation 342C of the alternative AV stream 242C includes supplemental content 346, such as a supplemental video stream. The representations 332, 342A-C of the AV streams 232, 242A-C may also include an identifier, such as a name, of the individual or entity that generated/produced the corresponding AV streams 232, 242A-C.

The user may select one of the representations 332, 342A-C of the AV streams 232, 242A-C that were available at the selected marked point-in-time 210B, such as the representation 332 of the primary AV stream 232 generated by the primary CP device 132. The set-top device 110 may transmit an indication of the selection to the metadata server 116 and/or the AV stream storage server 120. In one or more implementations, the metadata server 116 may configure the AV stream storage server 120 to provide the selected primary AV stream 232 beginning at the selected marked point-in-time 210B. In one or more implementations, the metadata server 116 may provide the set-top device 110 with an identifier for accessing the selected primary AV stream 232 from the AV stream storage server 120. In one or more implementations, the AV stream storage server 120 may receive an indication of the selection from the set-top device 110 and may provide the selected primary AV stream 232 to the set-top device 110. The set-top device 110 may receive the primary AV stream 232, beginning at the marked point-in-time 210B, and may present the primary AV stream 232 on the output device 114.

Figure 4:
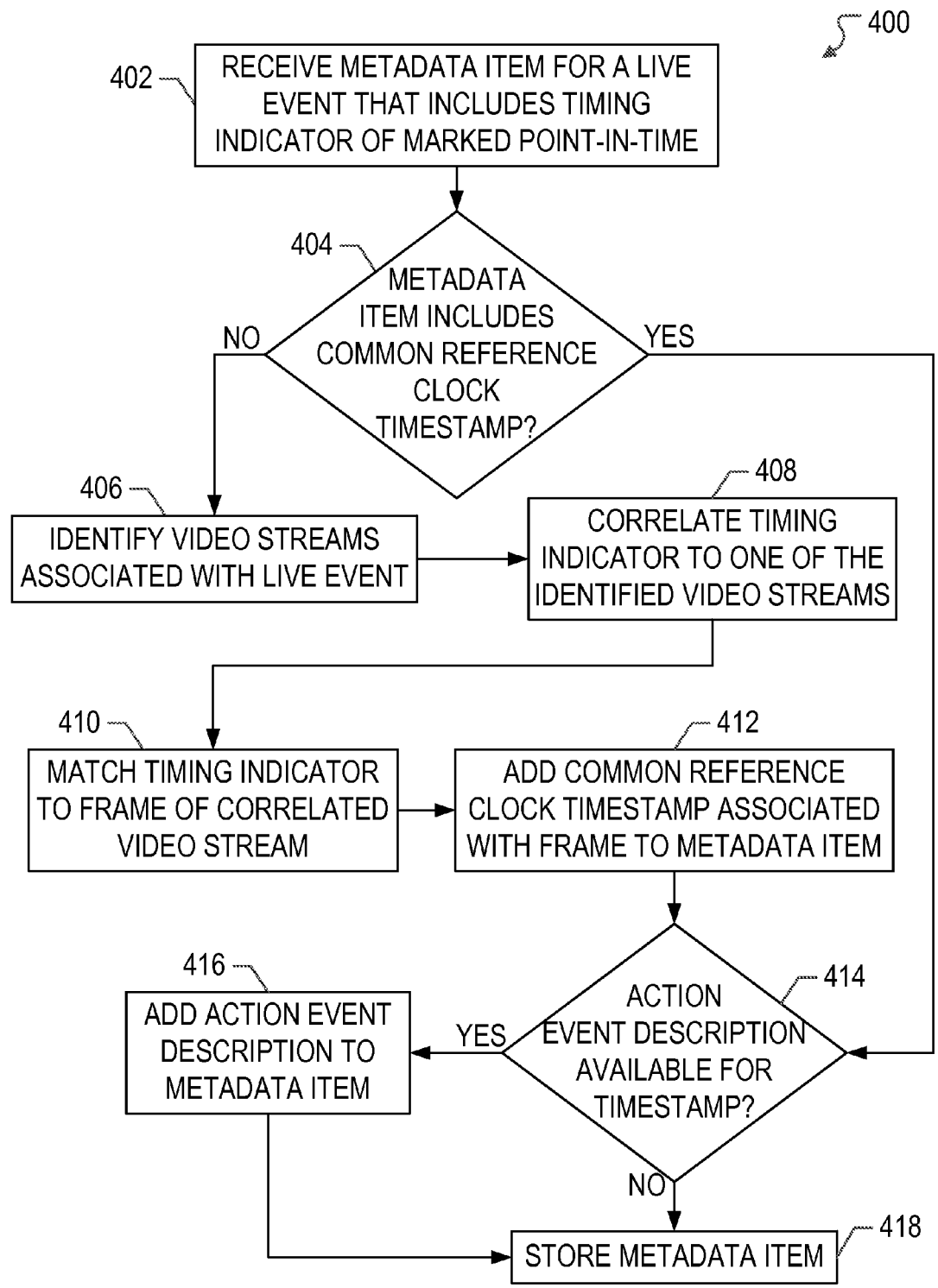
FIG. 4 illustrates a flow diagram of an example process for creating a marked point-in-time in a system for presentation timeline synchronization across AV streams in accordance with one or more implementations.

FIG. 4 illustrates a flow diagram of an example process 400 for creating a marked point-in-time in a system for presentation timeline synchronization across AV streams in accordance with one or more implementations. For explanatory purposes, the example process 400 is primarily described herein with reference to the metadata server 116 of FIG. 1; however, the example process 400 is not limited to the metadata server 116 of FIG. 1, and the example process 400 may be performed by one or more components of the metadata server 116. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The metadata server 116 receives a metadata item for a live event 130 that includes a timing indicator of a marked point-in-time, e.g. from a set-top device 110 or a secondary device 112 associated with a user (402). In one or more implementations, the metadata item may include an event identifier, a user identifier, and a timing indicator, such as a common reference clock timestamp, one or more frames, and/or statistical fingerprint information describing the one or more frames. The metadata server 116 determines whether the received metadata item includes a common reference clock timestamp (404), e.g. retrieved from an AV stream 232, 242A-C by the set-top device 110.

If the received metadata item does not include a common reference clock timestamp (404), the metadata server 116 identifies video streams associated with the live event 130 (406). For example, the metadata server 116 may identify video streams generated by the video cameras 128A-C for the live event 130 and stored by the video stream server 124, e.g. based on the event identifier, and/or the metadata server 116 may identify AV streams (that include video streams) generated for the live event 130 and stored by the AV stream storage server 120, e.g. based on the event identifier.

The metadata server 116 may correlate the timing indicator of the received metadata item to one of the identified video streams (408). In one or more implementations, the received metadata item may include a video camera identifier, and/or a video stream identifier, that can be correlated to one of the video streams stored by the video stream server 124 and/or an AV stream identifier that can be correlated to one of the AV streams stored by the AV stream storage server 120. In one or more implementations, if the metadata item does not include a video camera identifier and/or a AV stream identifier, the metadata server 116 may compare the one or more frames (or statistical information) of the metadata item to the video streams and/or the AV streams one-by-one, until the one or more frames (or statistical information) of the metadata item can be correlated to one of the video streams or AV streams.

The metadata server 116 matches the timing indicator to one or more frames of the correlated video stream (410). For example, the metadata server 116 may search the correlated video stream for the one or more frames, or the statistical information describing one or more frames, included in the metadata item. In one or more implementations, the metadata server 116 may utilize a fingerprint search, e.g. a video fingerprinting algorithm, to search the correlated video stream, such as by searching spatial signatures, temporal signatures, color signatures, or generally any video fingerprinting search algorithms, or any other mechanism for matching the one or more frames of the metadata item to corresponding frames of a video stream. The metadata server 116 retrieves a common reference clock timestamp associated with the one or more matched frames of the correlated video stream, e.g. from transport stream packet headers, and adds the common reference clock timestamp to the metadata item (412).

If the metadata item includes a common reference clock timestamp (404), or once a common reference clock timestamp is added to the metadata item (412), the metadata server 116 determines whether an action event description is available for the common reference clock timestamp (414). For example, the metadata server 116 may search for other metadata items that include a common reference clock timestamp that is within a temporal threshold of the common reference clock timestamp of the metadata item for the marked point-in-time. For example, an owner/provider of the live event 130, or a third party entity, may generate metadata items that describe action events during the live event 130, such as plays within a sporting event. The metadata items may include a common reference clock timestamp and may include a description of an action event that was occurring during the live event 130 at the corresponding time.

If the metadata server 116 determines that an action event description is available for the common reference clock timestamp (414), the metadata server 116 adds at least a portion of the action event description to the metadata item for the marked point-in-time (416) and stores the metadata item (418), e.g. in the data store 118. If the metadata server 116 determines that no action event descriptions are available for the common reference clock timestamp (414), the metadata server 116 stores the metadata item (418), e.g. in the data store 118.

Figure 5:
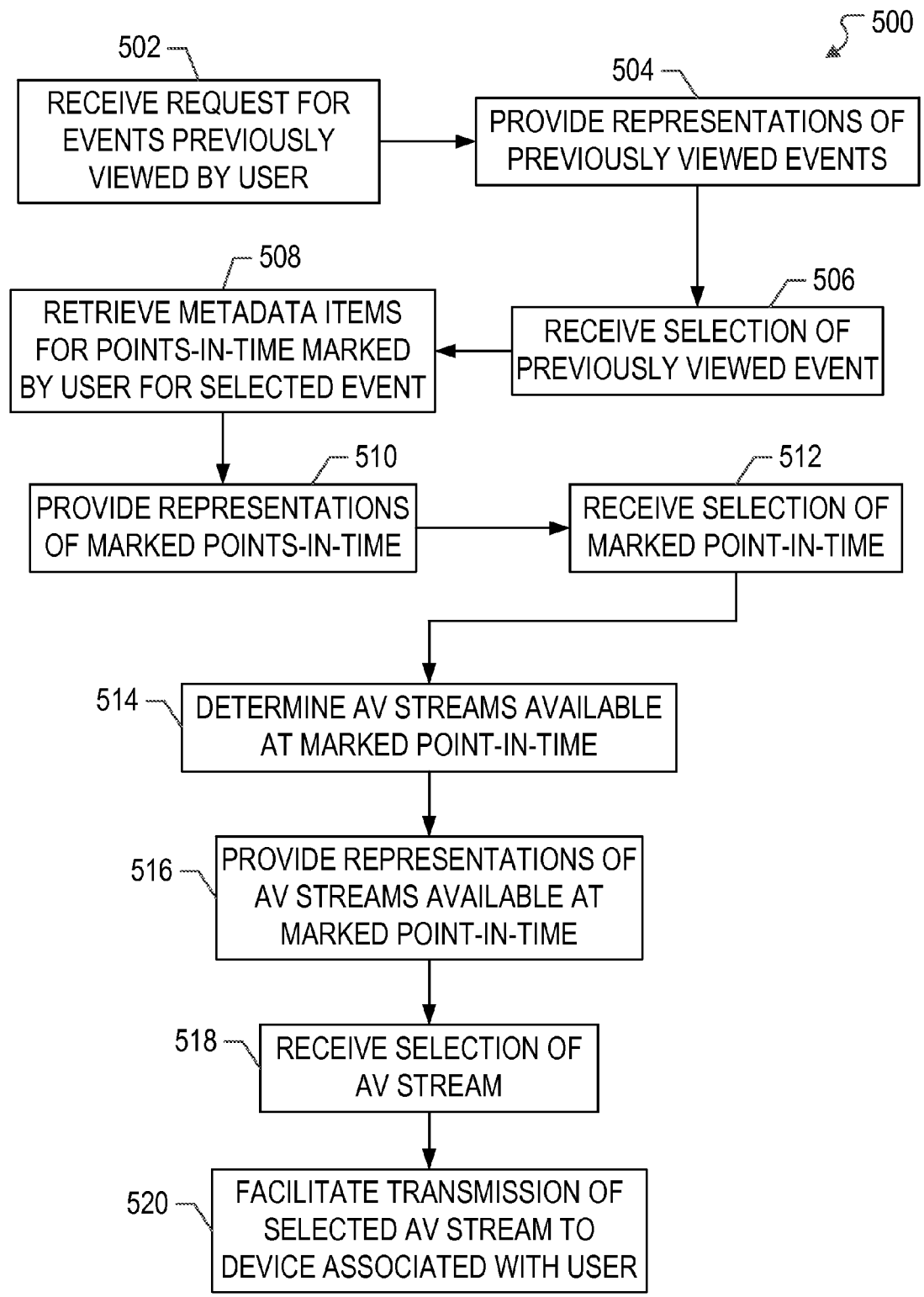
FIG. 5 illustrates a flow diagram of an example process for retrieving a marked point-in-time in a system for presentation timeline synchronization across AV streams in accordance with one or more implementations.

FIG. 5 illustrates a flow diagram of an example process 500 for retrieving a marked point-in-time in a system for presentation timeline synchronization across AV streams in accordance with one or more implementations. For explanatory purposes, the example process 500 is primarily described herein with reference to the metadata server 116 of FIG. 1; however, the example process 500 is not limited to the metadata server 116 of FIG. 1, and the example process 500 may be performed by one or more components of the metadata server 116. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The metadata server 116 receives a request for events previously viewed by a user, e.g. from a set-top device 110 and/or a secondary device 112 associated with the user (502). In one or more implementations, the request may include a user identifier of the user. The metadata server 116 may search, e.g. the data store 118, for metadata items for marked points-in-time 210A-C that were marked by the user, e.g. that include the user identifier. The metadata server 116 may retrieve the unique event identifiers from the metadata items that include the user identifier and may retrieve representations 304A-C of the events from the metadata items, e.g. the one or more frames included in the metadata items. The metadata server 116 provides the representations 304A-C of the previously viewed events to the set-top device 110 (504). Thus, in one or more implementations, the previously viewed events may only include events for which the user marked a point-in-time, and consequently metadata for the marked point-in-time was generated and stored, e.g. in the data store 118.

The metadata server 116 receives a selection of one of the representations 304A-C of the previously viewed events that were provided to the set-top device 110 (506). For example, the set-top device 110 may present the representations 304A-C, e.g. via user interface 300, and the user may select one of the presented representations 304A-C. In one or more implementations, the selection received by the metadata server 116 may include an event identifier of the selected event. The metadata server 116 retrieves metadata items for points-in-time marked 210A-C by the user for the selected event (508). For example, the metadata server 116 may search, e.g. the data store 118, for metadata items that include the user identifier and the event identifier, and the metadata server 116 may retrieve representations 310A-C of the marked points-in-time 210A-C from the metadata items, e.g. the one or more frames included in the metadata items and/or any action event descriptions included in the metadata items.

The metadata server 116 provides the representations 310A-C of the marked points-in-time 210A-C(510), e.g. to the set-top device 110 and/or the secondary device 112 associated with the user. The metadata server 116 receives a selection of one of the representations 310A-C of the marked points-in-time 210A-C(512), e.g. from the set-top device 110 and/or the secondary device 112. The metadata server 116 determines the AV streams that are available for the event at the marked point-in-time (514). For example, the metadata server 116 may search the data store 122 of the AV stream storage server 120 for AV streams that are associated with the event identifier. In one or more implementations, the metadata server 116 may determine which of the AV streams include a video stream and/or an audio stream for the marked point-in-time, e.g. based at least on the common reference clock timestamp corresponding to the marked point-in-time.

The metadata server 116 may retrieve one or more frames from the available AV streams corresponding to the marked point-in-time, and may provide the one or more frames for each of the AV streams 232, 242A-C as representations 332, 342A-C of the AV streams 232, 242A-C(516). In one or more implementations, the metadata server 116 may also provide an identifier, such as a name, of the individual or entity that generated/produced each of the AV streams 232, 242A-C. The metadata server 116 receives a selection of one of the representations 332, 342A-C of the AV streams 232, 242A-C(518), e.g. from the set-top device 110 and/or the secondary device 112.

The metadata server 116 facilitates transmission of the selected AV stream to a device associated with the user, such as the set-top device 110 and/or the secondary device 112 (520). For example, the metadata server 116 may transmit a message to the AV stream storage server 120 to transmit the selected AV stream, beginning at the marked point-in-time, to the set-top device 110 and/or the secondary device 112, the metadata server 116 may retrieve the selected AV stream from the data store 122 and may forward the AV stream to the set-top device 110 and/or the secondary device 112, and/or the metadata server 116 may transmit an identifier, such as a network identifier, for accessing the AV stream from the data store 122, beginning at the marked point-in-time, to the set-top device 110 and/or the secondary device 112.

Figure 6:
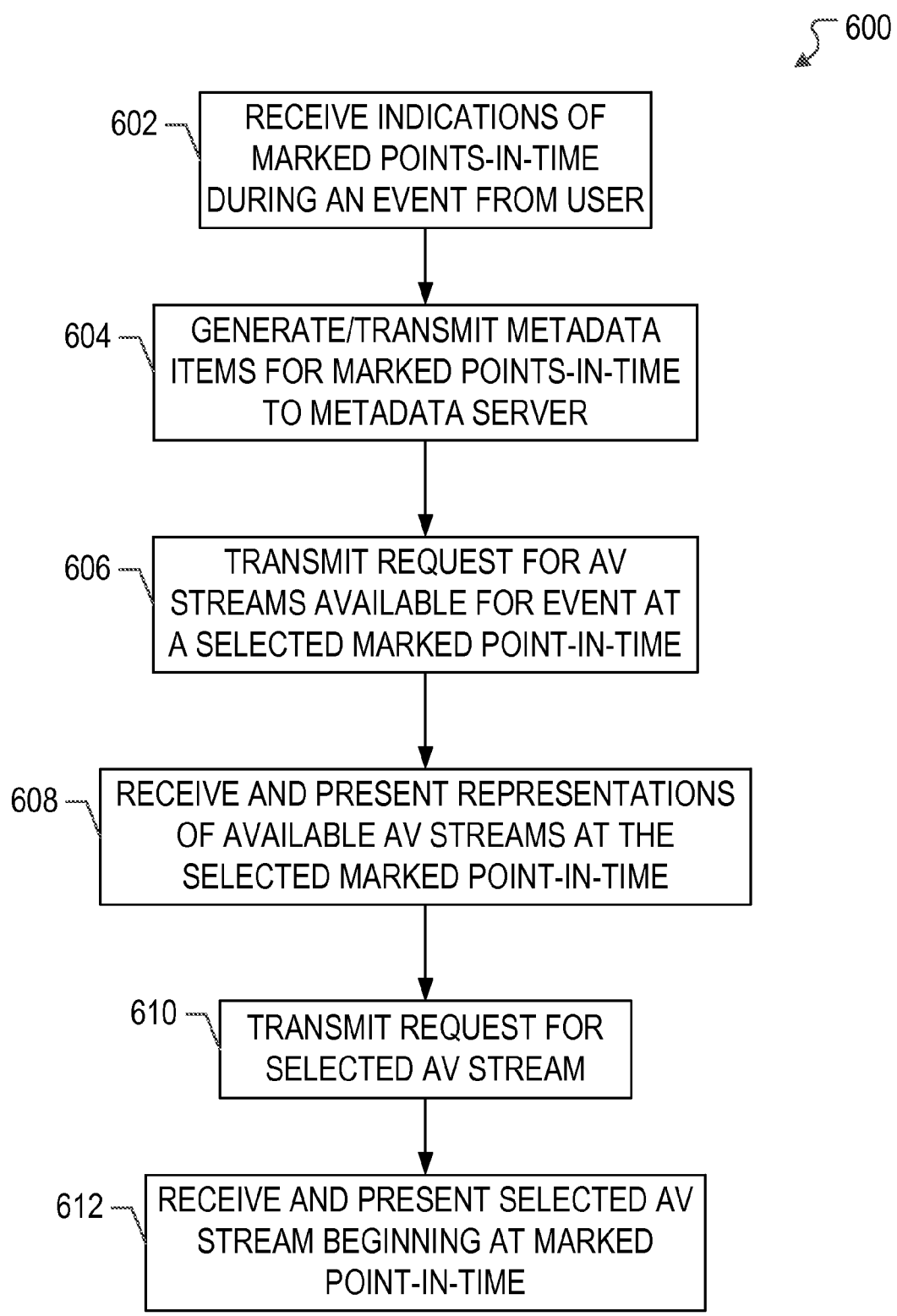
FIG. 6 illustrates a flow diagram of an example process of a user device in a system for presentation timeline synchronization across AV streams in accordance with one or more implementations.

FIG. 6 illustrates a flow diagram of an example process 600 of a user device in a system for presentation timeline synchronization across AV streams in accordance with one or more implementations. For explanatory purposes, the example process 600 is primarily described herein with reference to the set-top device 110 and/or the secondary device 112 of FIG. 1; however, the example process 600 is not limited to the set-top device 110 and/or secondary device 112 of FIG. 1, and the example process 600 may be performed by one or more components of the set-top device 110 and/or the secondary device 112. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The set-top device 110 and/or the secondary device 112 may receive indications of marked points-in-time for an event, such as the live event 130, from a user interacting with the set-top device 110 and/or the secondary device 112 (602). For example, the user may use a remote control to interact with the set-top device 110 to mark a point-in-time. The set-top device 110 and/or the secondary device 112 generates a metadata item corresponding to the marked point-in-time and transmits the metadata item to the metadata server 116 (604).

In one or more implementations, the set-top device 110 may generate a metadata item that includes the event identifier, the user identifier, a timing indicator, a video camera identifier and/or an AV stream identifier. In one or more implementations, the secondary device 112 may generate a metadata item that includes the user identifier and the event identifier. In one or more implementations, the secondary device 112 may request one or more of the event identifier, the timing indicator, the video camera identifier, and/or the AV stream identifier from the set-top device 110, e.g. via a local area network. In one or more implementations, the secondary device 112 may transmit a metadata item that includes the user identifier, or the user identifier and the event identifier, to the metadata server 116 and the metadata server 116 may request one or more of the event identifier, the timing indicator, the video camera identifier, and/or the AV stream identifier from the set-top device 110, e.g. based at least on the user identifier.

The set-top device 110 and/or the secondary device 112 may transmit a request for AV streams 232, 242A-C available at a selected marked point-in-time during the live event 130 (606). For example, the set-top device 110 may present the user interface 300 to the user, and the user may select one of the representations 310A-C of the marked points-in-time 210A-C. The set-top device 110 and/or the secondary device 112 may receive and present representations 332, 342A-C of AV streams 232, 242A-C that were available at a selected marked point-in-time (608), e.g. via the user interface 300. The set-top device and/or the secondary device 112 may transmit a request for a selected AV stream (610). For example, the user may select one of the representations 332, 342A-C of the available AV streams 232, 242A-C via the user interface 300.

The set-top device 110 and/or the secondary device 112 receives and presents the selected AV stream beginning at the selected marked point-in-time (612). In one or more implementations, the request for the selected AV stream (610) may be transmitted via one of the devices, such as the secondary device 112, and the selected AV stream may be received and presented by the other device, such as the set-top device 110. Thus, the user may view the marked points-in-time for an event, and select one of the AV streams available for a selected marked point-in-time via the secondary device 112 and the user may view the selected AV stream on the output device 114, via the set-top device 110.

Figure 7:
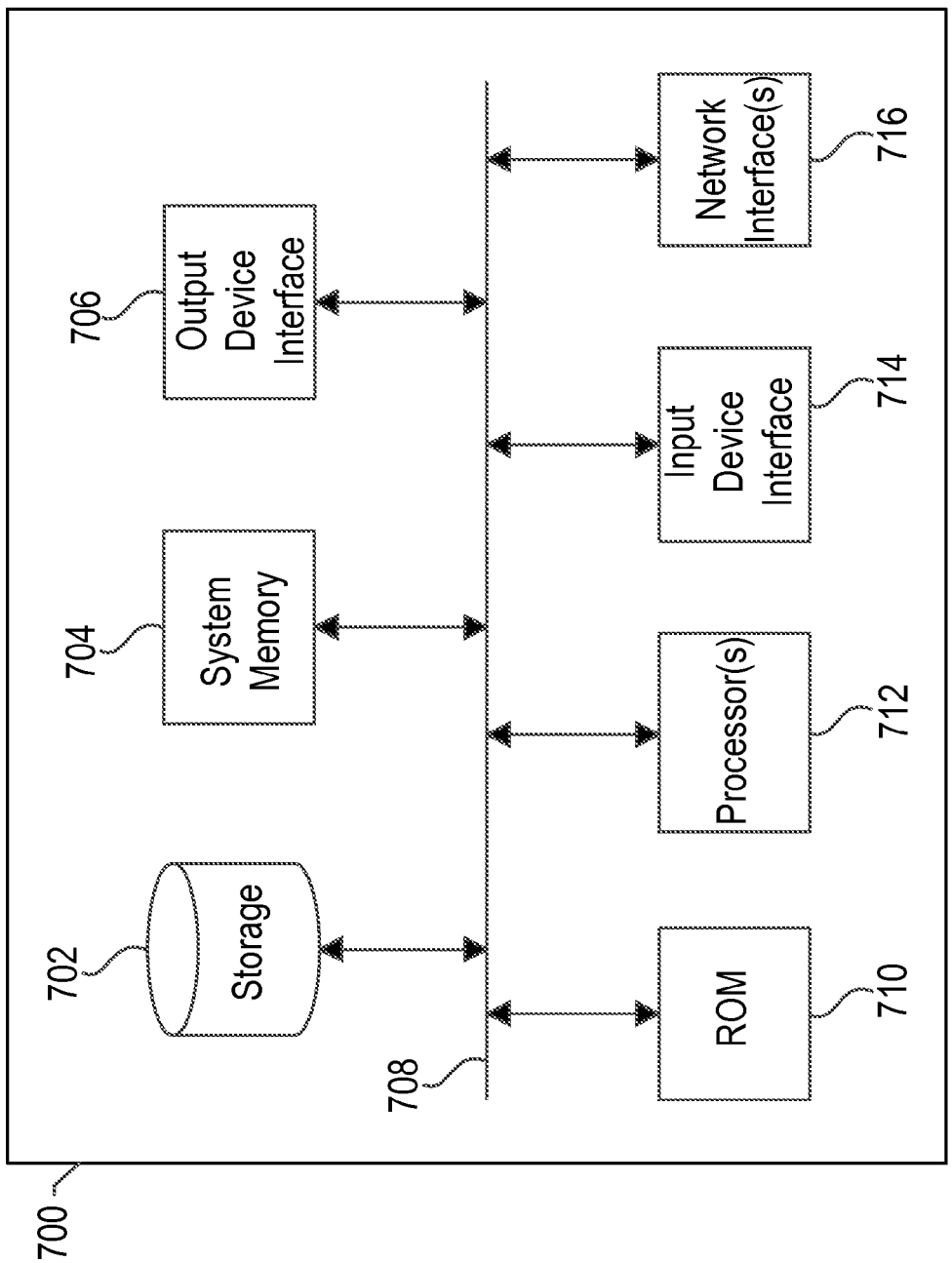
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, can be a gateway device, a set-top device, a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. The electronic system 700 includes a bus 708, one or more processor(s) 712, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 700 can be a part of one or more networks of computers (such as a local area network ("LAN"), a wide area network ("WAN"), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer program product comprising instructions stored in a non-transitory computer-readable storage medium, the instructions comprising:
   instructions to receive a metadata item that comprises an identifier of an event, a timing indicator, and a user identifier of a user, from a device that is presenting one of a plurality of video streams associated with the event to the user, wherein the timing indicator comprises a frame of the one of the plurality of videos streams;
   instructions to identify, based at least on the identifier of the event, the plurality of video streams associated with the event;
   instructions to correlate the frame of the timing indicator to the one of the plurality of video streams associated with the event by searching the plurality of video streams for the frame of the timing indicator;
   instructions to match the frame of the timing indicator to the frame of the one of the plurality of video streams; and
   instructions to append a timestamp associated with the frame to the metadata item and storing the metadata item.

2. The computer program product of claim 1, wherein the timing indicator comprises statistical fingerprint information describing the frame of the one of the plurality of video streams or the timing indicator comprises the frame of the one of the plurality of videos streams.

3. The computer program product of claim 2, wherein the instructions to match the timing indicator to the frame of the one of the plurality of video streams comprises:
   instructions to perform a fingerprint search on the one of the plurality of video streams to determine the frame of the one of the plurality of video streams described by the statistical fingerprint information of the timing indicator.

4. The computer program product of claim 1, wherein the received metadata item further comprises a video stream identifier that identifies the one of the plurality of video streams and wherein the instructions to correlate the timing indicator to the one of the plurality of video streams comprises:
instructions to correlate the timing indicator to the one of the plurality of video streams associated that is identified by the video stream identifier.

5. The computer program product of claim 1, wherein the event is associated with a geographic location and the plurality of video streams associated with the event are generated by a plurality of video cameras located at the geographic location.

6. The computer program product of claim 5, wherein the plurality of video streams generated by the plurality of video cameras comprise common reference clock timestamps that are synchronized with a common reference clock having a time base corresponding to a start of the event.

7. The computer program product of claim 6, wherein the timing indicator comprises the common reference clock timestamp associated with the frame of the one of the plurality of video streams.

8. The computer program product of claim 1, the instructions further comprising:
instructions to receive a request for a portion of an audio-video (AV) stream associated with the event, wherein the request comprises an indication of the metadata item and the AV stream includes another video stream of the plurality of video streams associated with the event;
instructions to determine the timestamp appended to the metadata item; and
instructions to facilitate transmission of the portion of the AV stream that begins at another frame of the another video stream of the plurality of video streams that is associated with the timestamp.

9. The computer program product of claim 1, wherein the instructions further comprise:
instructions to receive a second metadata item from a second device that is presenting a second one of the plurality of video streams to a second user, wherein the metadata item is accessible to the user exclusive of the second user and the second metadata item is accessible to the second user exclusive of the user.

10. The computer program product of claim 1, wherein the instructions to receive the metadata item that comprises the identifier of the event and the timing indicator further comprise:
instructions to receive the metadata item that comprises the identifier of the event and the timing indicator from a secondary device associated with a user, the secondary device being proximally located to a device that is presenting the one of the plurality of video streams to the user.

11. A system, comprising:
one or more computing devices; and
a memory including instructions that, when executed by the one or more computing devices, cause the one or more computing devices to:
receive, from a device associated with a user, a request for audio-video (AV) streams associated with an event that were recorded at a marked point-in-time during the event, the marked point-in-time having been marked by the user while being presented with one of the AV streams;
retrieve a metadata item corresponding to the marked point-in-time based at least on an identifier of the user and an identifier of the event;
determine a timestamp associated with the marked point-in-time based at least in part on the metadata item;
identify the AV streams associated with the event that were recorded during the event at the marked point-in-time, each of the AV streams including a video stream that comprises a frame corresponding to the timestamp; and
facilitate transmission, to the device associated with the user, of another of the AV streams associated with the event beginning with the frame associated with the timestamp associated with the marked point-in-time that was marked by the user while being presented with the one of the AV streams, the another of the AV streams differing from the one of the AV streams that was previously presented to the user at the marked point-in-time.

12. The system of claim 11, wherein the instructions, when executed by the one or more computing devices, cause the one or more computing devices to:
provide, to the device associated with the user, a network identifier for accessing, from a server, the one of the AV streams beginning at the frame associated with the timestamp.

13. The system of claim 11, wherein the timestamp comprises a common reference clock timestamp having a time base corresponding to a start of the event.

14. The system of claim 13, wherein the instructions, when executed by the one or more computing devices, cause the one or more computing devices to:
retrieve the timestamp associated with the marked point-in-time from the metadata item.

15. The system of claim 11, wherein the one of the AV streams associated with the event comprises a first video stream and the another of the AV streams associated with the event comprises a second video stream that is different than the first video stream.

16. A method for presentation timeline synchronization across audio-video (AV) streams, the method comprising:
transmitting an indication of a marked point-in-time during an event that was marked by a user while being presented with an AV stream associated with the event;
receiving and simultaneously presenting, after the marked point-in-time, first image representations of other AV streams associated with the event that were recorded during the event at the marked point-in-time;
transmitting a request for one of the other AV streams associated with the event; and
receiving the one of the other AV streams associated with the event beginning at the marked point-in-time.

17. The method of claim 16, wherein transmitting the request for one of the other AV streams is performed by a secondary device associated with the user and receiving the one of the other AV streams is performed by a set-top device associated with the user.

18. The method of claim 17, further comprising:
transmitting, by the set-top device, the indication of the marked point-in-time while presenting, by the set-top device, the AV stream associated with the event to the user.

19. The method of claim 16, wherein the indication of the marked point-in-time and the request are transmitted to a metadata server and the one of the other AV streams is received from a storage server that is separate from the metadata server.

20. The method of claim 19, wherein receiving the one of the other AV streams associated with the event beginning at the marked point-in-time comprises:
   receiving, from the metadata server, a network identifier for accessing the one of the other AV streams from the storage server; and
   retrieving the one of the other AV streams from the storage server based at least on the network identifier.

21. The method of claim 16, wherein receiving and simultaneously presenting the first image representations of the other AV streams associated with the event that were recorded during the event at the marked point-in-time further comprises:
   simultaneously presenting second image representations of a plurality of marked points-in-time that were marked by the user while being presented with the AV stream associated with the event.

22. The method of claim 21, wherein receiving and simultaneously presenting the first image representations of the other AV streams associated with the event that were recorded during the event at the marked point-in-time further comprises:
   simultaneously presenting third image representations of a plurality of events that were viewed by the user.

* * * * *